US009810267B2

(12) United States Patent
Hale

(10) Patent No.: US 9,810,267 B2
(45) Date of Patent: Nov. 7, 2017

(54) RETENTION ARRANGEMENT FOR A ROLLING ELEMENT BEARING

(71) Applicant: Schaeffler Technologies AG & Co. KG, Herzogenaurach (DE)

(72) Inventor: Allen Hale, Commerce, MI (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 15/096,507

(22) Filed: Apr. 12, 2016

(65) Prior Publication Data
US 2016/0341253 A1    Nov. 24, 2016

Related U.S. Application Data

(60) Provisional application No. 62/163,715, filed on May 19, 2015.

(51) Int. Cl.
*F16C 35/077* (2006.01)
*F16C 19/06* (2006.01)
*F16C 35/04* (2006.01)
*F16C 35/067* (2006.01)
(Continued)

(52) U.S. Cl.
CPC .......... *F16C 35/042* (2013.01); *F16C 35/067* (2013.01); *F16B 2/24* (2013.01); *F16C 19/06* (2013.01); *F16C 19/525* (2013.01); *F16C 2226/50* (2013.01); *F16C 2226/60* (2013.01); *F16C 2226/74* (2013.01); *F16C 2360/22* (2013.01)

(58) Field of Classification Search
CPC ...... F16C 19/06; F16C 19/525; F16C 35/043; F16C 35/067; F16C 2226/60; F16C 2226/74; F16C 2360/22; F16B 21/183; F16B 2/24

USPC ........ 384/434–435, 443, 539, 560–561, 585, 384/588, 903; 285/86, 301, 321, 345
See application file for complete search history.

(56) References Cited

U.S. PATENT DOCUMENTS 1,464,386 A * 8/1923 Ingram ................. F16L 37/148
285/276
1,481,705 A * 1/1924 Gimeno ................. F16C 33/60
384/559
(Continued)

FOREIGN PATENT DOCUMENTS

DE  WO-2013159919 A1 * 10/2013 ............ F16C 35/067
EP  2006561 A1   12/2008
(Continued)

OTHER PUBLICATIONS

International Search Report and Opinion for PCT/US2016/027096; 11 pgs; dated Jul. 27, 2016 by the Korean Intellectual Property Office.

*Primary Examiner* — Marcus Charles
(74) *Attorney, Agent, or Firm* — Matthew V. Evans

(57) ABSTRACT

A rolling element bearing retention arrangement provides axial and rotational retention of a rolling element bearing within a housing. A retaining ring is received partially within circumferential grooves located on an outer ring of the rolling element bearing, and within a bore of the housing, providing axial retention. Inward and outward directed protrusions on each end of the retaining ring engage cavities within the respective circumferential grooves, providing rotational retention.

8 Claims, 10 Drawing Sheets

(51) Int. Cl.
*F16B 2/24* (2006.01)
*F16C 19/52* (2006.01)

(56) References Cited

U.S. PATENT DOCUMENTS

| | | | | | |
|---|---|---|---|---|---|
| 2,051,704 | A | * | 8/1936 | Harris | F16C 35/067 301/5.7 |
| 2,890,073 | A | * | 6/1959 | Thomas | F42B 15/36 285/305 |
| 4,192,225 | A | * | 3/1980 | Moyer | F16J 10/02 285/321 |
| 4,511,191 | A | * | 4/1985 | Kitamura | F16C 35/067 384/536 |
| 5,245,911 | A | * | 9/1993 | Yuda | F16L 33/04 92/128 |
| 5,582,482 | A | * | 12/1996 | Thom, Jr. | F16C 13/02 384/434 |
| 5,785,433 | A | * | 7/1998 | Takahashi | F16C 35/067 384/255 |
| 6,042,275 | A | | 3/2000 | Muntnich et al. | |
| 6,705,763 | B2 | * | 3/2004 | Kamura | B60B 27/00 384/539 |
| 7,175,349 | B2 | * | 2/2007 | Sakamoto | B60B 3/16 384/544 |
| 7,866,891 | B2 | * | 1/2011 | Waseda | F16C 33/516 384/457 |
| 8,132,968 | B2 | * | 3/2012 | Fukumura | B60B 27/00 384/537 |
| 8,393,800 | B2 | * | 3/2013 | Abe | F16C 9/02 384/457 |
| 8,616,325 | B1 | * | 12/2013 | Mesa | B60K 17/24 180/359 |
| 8,740,467 | B2 | * | 6/2014 | Ravenna | B60L 327/0005 384/537 |
| 8,961,028 | B2 | | 2/2015 | Beck et al. | |
| 9,068,473 | B2 | * | 6/2015 | House | F01D 25/16 |
| 2005/0105840 | A1 | * | 5/2005 | Muranaka | B60L 327/00 384/544 |
| 2012/0045326 | A1 | | 2/2012 | House et al. | |
| 2012/0051906 | A1 | | 3/2012 | House et al. | |

FOREIGN PATENT DOCUMENTS

| | | | |
|---|---|---|---|
| JP | 2009008202 A | 1/2009 | |
| JP | 2009036320 A | 2/2009 | |
| JP | 2013113305 A * | 6/2013 | F16C 57/04 |

* cited by examiner

US 9,810,267 B2

RETENTION ARRANGEMENT FOR A ROLLING ELEMENT BEARING

BACKGROUND

The present disclosure relates to a rolling element bearing assembly, and more particularly, to a retention arrangement of a rolling element bearing assembly within a bore of a housing.

As fuel economy becomes paramount in the transportation industry, efforts have increased to achieve higher vehicle and internal combustion (IC) engine efficiencies. Rolling element bearings are well known and can be arranged within IC engines to reduce the friction of rotating shaft assemblies, such as crankshafts, camshafts, and balance shafts. The implementation of a rolling element bearing within such shaft systems requires a thorough design effort to ensure that function and performance targets are met for the life of the IC engine. Design considerations include material hardness and metallurgical cleanliness, surface finish, tolerances, installation fits, operating clearance, and accessibility of lubrication to critical areas of the bearing. The harsh environment of an IC engine, including vibrational loading and substantial temperature fluctuations, contributes to the challenge of designing a rolling element bearing that meets lifetime requirements.

Lightweighting is another means of increasing the fuel economy of today's vehicles. Significant strides have been made in the material sector to provide steel alternatives, such as plastic and aluminum, which not only offer significant weight savings, but also potential improvements in performance and cost. Aluminum cylinder heads and engine blocks are becoming prevalent in the IC engine industry. Additionally, stress analyses to optimize and manage the shape of components have intensified resulting in thinner cross-sections and reduced overall package sizes. Management of the inherent properties of steel alternatives is especially vital in critical applications such as those found in an IC engine.

Rolling element bearings are typically circular in shape, and generally comprise of rolling elements disposed between inner and outer raceways that are integrated within an inner and outer ring, respectively. Rolling elements can take many forms including spherical balls, cylindrical rollers, needle rollers, or various other configurations such as cone-shaped tapered rollers or barrel-shaped spherical rollers. Cages are often used to contain the rolling elements and guide them throughout the rotating motion of the bearing, but are not a necessity in some configurations. The materials of rolling element bearings have remained relatively consistent, with the exception of plastic cages, as steel remains to be the material of choice for the inner and outer rings.

The application of a rolling element bearing with a steel outer ring to a shaft system within an aluminum cylinder head or engine block of an IC engine offers many design challenges. One of these design challenges is providing axial and rotational retention or containment of the rolling element bearing within a bore of an aluminum housing which is typically required for these shaft systems. Given the fact that the coefficient of thermal expansion (COTE) of aluminum is roughly twice as much as steel and that the typical specified temperature operating range is −40 to 150 degrees Celsius, retention designs must manage the extreme size variation of the aluminum housing bore relative to the outer diameter of the steel outer ring of the rolling element bearing.

With view to the prior art in FIG. 1, a rolling element bearing assembly 100 is shown with a retaining ring 120 partially received by a circumferential groove 170 of an outer ring 180. An inner ring 160 and cage 140 to separate and guide rolling elements (not shown) complete the rolling element bearing assembly 100. The retaining ring 120 is designed to reside partially within the circumferential groove 170 and partially within a circumferential groove within a bore of a housing (not shown). Of design importance is the fact that the retaining ring 120 is rotatable within the circumferential groove 170 of the outer ring 180 during use. For this prior art rolling element bearing assembly 100, in the event of a loss of contact between the bore of the housing and the outer diameter of the outer ring, the retaining ring 120 would provide axial containment, however, rotational containment would not be provided. The lack of rotational containment offered by the prior art fails to address the needs of many IC engine shaft systems, therefore, many times these systems eliminate the use of the retaining ring 120 and incorporate a heightened interference fit between the outer ring 180 and housing bore. However, to facilitate retention of the steel outer ring in an aluminum housing at a peak engine temperature of 150° C., a severe interference fit at room temperature (normal installation temperature) is required in order to compensate for the fact that the aluminum bore diameter increases more than the steel outer ring diameter as temperature increases. Due to its severity, such an interference fit can induce stresses beyond the material limits which can lead to immediate or eventual failure as the interference fit becomes more pronounced at cold temperatures when the aluminum bore contracts more than the steel outer ring. In addition, if the wall thickness of the housing around the circumference of the outer ring is non-uniform, the resultant contact pressure between the housing and outer ring will also be non-uniform. In the case of a heightened press-fit, the high contact pressure points could elastically deform the outer ring of the bearing to a non-circular shape, becoming even more pronounced at cold temperatures, again, as the aluminum housing contracts more than the steel outer ring. Any distortion or deformation of the outer ring could potentially lead to premature failure of the bearing.

Yet another consequence of the required severe interference fit between an aluminum housing and a steel outer ring of a rolling element bearing is the effect on the internal bearing clearance, often termed radial operating clearance. The contact pressure that acts on the outer ring in an interference fit condition causes the inner and outer radial surfaces to become smaller in diameter, resulting in the radial operating clearance of the bearing to become less. In the case of an aluminum housing, the greater contraction of the housing bore relative to the steel outer ring at cold temperatures reduces the radial operating clearance even further. In order to avoid too severe of a reduced radial operating clearance condition at temperatures as low as −40° C., the design radial operating clearance is often increased to account for the described effect of an aluminum housing or any housing that has a higher COTE than steel. However, such an adjustment for the 'cold radial operating clearance' has a detrimental effect on the 'hot radial operating clearance.' Under hot conditions, the aluminum housing bore expands more than the outer diameter of the outer ring resulting in a significant loss in contact pressure, facilitating a growth in size of the outer ring, and causing the radial operating clearance to increase significantly. Additive to this increased radial operating clearance due to thermal expansion is the previously described adjustment clearance, which yields a final radial operating clearance that can be large enough to cause noise and/or excessive axial movement of the shaft, both of which should be avoided in IC engine applications.

Given the preceding discussion, a solution is needed that provides for axial and rotational retention of a rolling element bearing within a bore of a housing while minimizing any detrimental effect on radial operating clearance.

SUMMARY

A rolling element bearing retention arrangement that includes a rolling element bearing, a housing, and a retaining ring is provided that fulfills axial and rotational retention of the bearing within the housing. This arrangement is particularly effective for housings made of a higher COTE material than that of steel, such as aluminum, subjected to operating environments with large temperature variations. Axial and rotational retention is provided without the requirement of a severe interference fit between the outer ring and the bore of the housing in order to provide retention at elevated temperatures. The rolling element bearing includes rolling elements and an outer ring with an integrated outer raceway. The rolling elements can be of any of the many types available, including needles, cylindrical rollers, and balls. A cage and an inner ring with an integrated inner raceway are optional components. The outer diameter of the outer ring contains a circumferential groove for receiving a radial inward portion of the retention ring. The groove can be of any shape that is suitable for receiving the retaining ring and contains a first cavity at a prescribed angular location to receive an inward directed protrusion located at a first end of the retaining ring. The housing can be a one-piece or split two-piece design held together by at least one fastener, and contains a bore with an inner radial surface to receive the outer ring. The inner radial surface contains a circumferential groove for receiving a radially outward portion of the retention ring. The groove can be of any shape that is suitable for receiving a retention ring and includes a second cavity at a prescribed angular location to receive an outward directed protrusion of a second end of the retaining ring. The retaining ring can be of any suitable cross-section to reside partially within the first and second circumferential grooves. Proper installation of the rolling element bearing and retaining ring assembly within the bore of the housing requires that the outward directed protrusion of the second end of the retaining ring is disposed within the second cavity of the second circumferential groove of the bore of the housing.

While the previously described rolling element bearing mounting retention arrangement is particularly useful for housing materials with a higher COTE than that of the steel outer ring of the rolling element bearing, this arrangement can be applied to housings of any material.

BRIEF DESCRIPTION OF THE DRAWINGS

The foregoing Summary as well as the following Detailed Description will be best understood when read in conjunction with the appended drawings. In the drawings.

DETAILED DESCRIPTION OF THE EXAMPLE EMBODIMENTS

Figure 1:
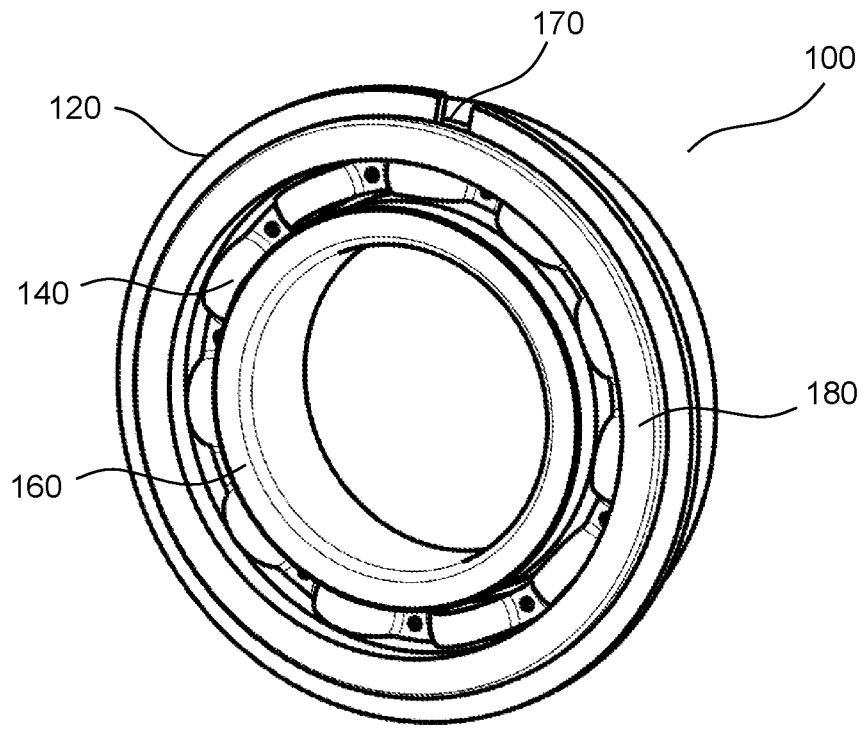
FIG. 1 is a perspective view of a prior art rolling element bearing and retaining ring assembly.
Figure 2:
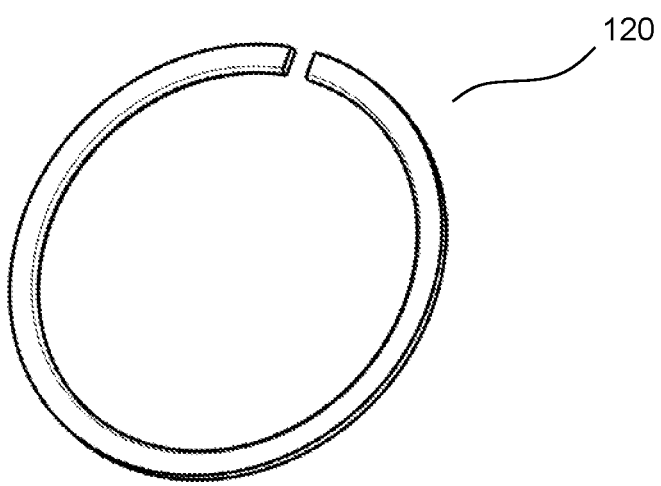
FIG. 2 is a perspective view of the prior art retaining ring.

Certain terminology is used in the following description for convenience only and is not limiting. The words "inner," "outer," "inward," and "outward" refer to directions towards and away from the parts referenced in the drawings. A reference to a list of items that are cited as "at least one of a, b, or c" (where a, b, and c represent the items being listed) means any single one of the items a, b, c or combinations thereof. The terminology includes the words specifically noted above, derivatives thereof, and words of similar import.

Figure 3:
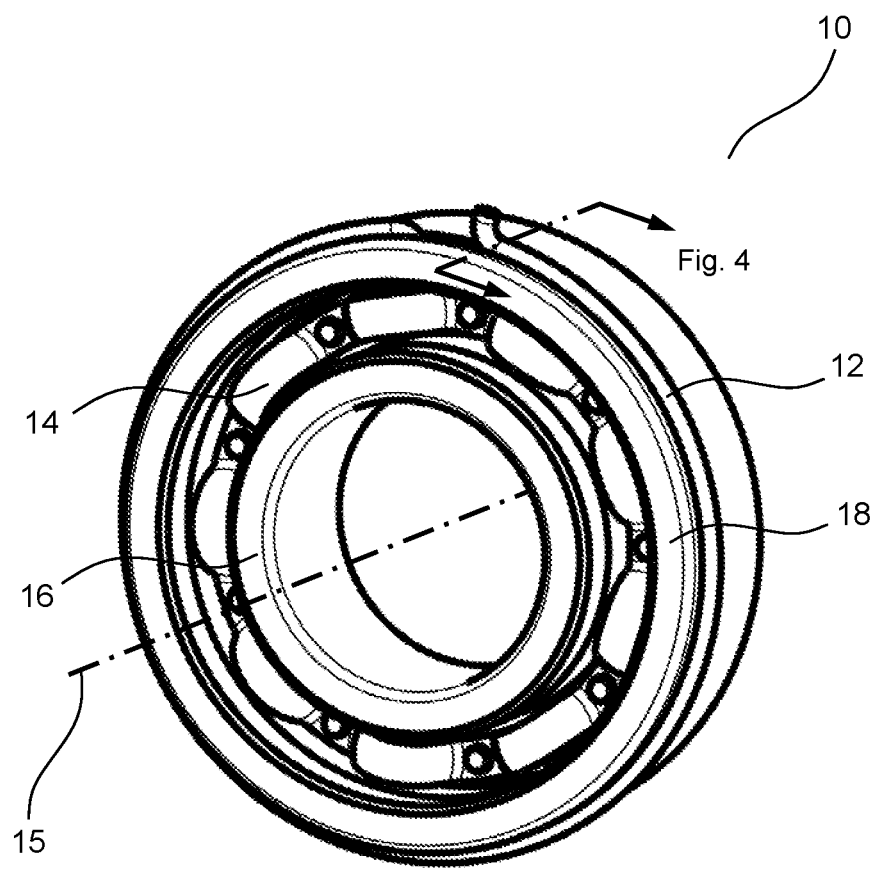
FIG. 3 is a perspective view of an example embodiment of a rolling element bearing assembly that includes a retaining ring.
Figure 4:
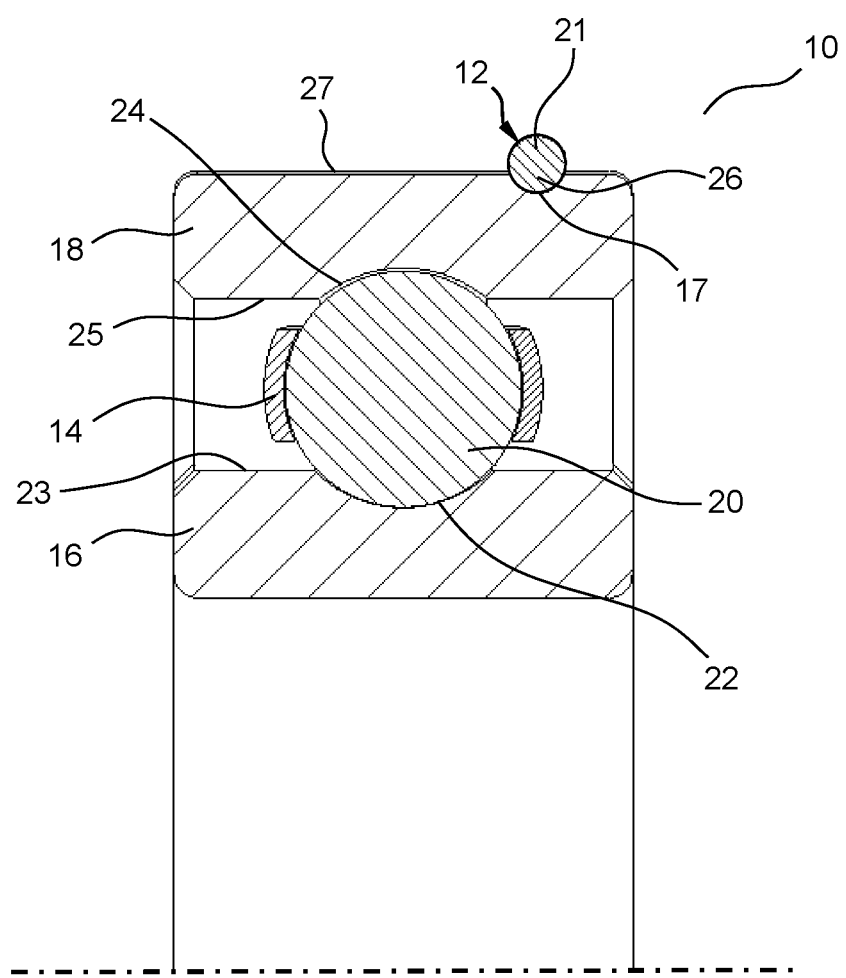
FIG. 4 is a cross-sectional view of the rolling element bearing assembly of FIG. 3.

Referring to FIGS. 3 and 4, an example embodiment of a rolling element bearing assembly 10 that rotates around central axis 15 is shown with a retaining ring 12, an outer ring 18, a ball cage 14, balls 20, and an inner ring 16. The outer ring 18 includes a first inner radial surface 25 having an outer rolling element raceway 24 and an outer radial surface 27 having a first circumferential groove 17. The inner ring 16 includes an outer radial surface 23 having an inner rolling element raceway 22. The inner ring 16 and ball cage 14 are optional, as many rolling element bearings without these components require axial and rotational retention during operation. From the cross-sectional view shown in FIG. 4, it is evident that a radial inward portion 26 of the retaining ring 12 is received by the first circumferential groove 17 and a radial outward portion 21 protrudes beyond the outer radial surface 27 of the outer ring 18.

Figure 5:
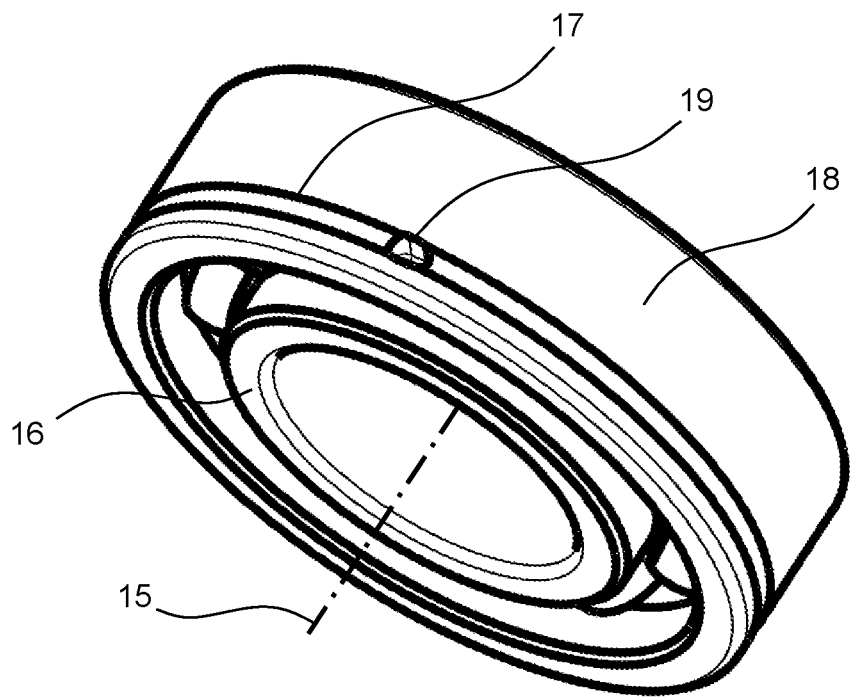
FIG. 5 is a perspective view of the rolling element bearing assembly of FIG. 3 without the retaining ring.
Figure 6:
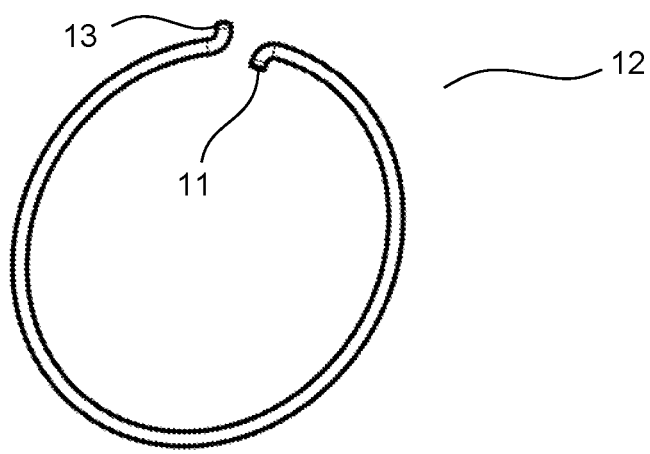
FIG. 6 is a perspective view of an example embodiment of the retaining ring.

Referring to FIGS. 5 through 8, further details of the installation interfaces for the retaining ring 12 are shown. FIG. 5 shows the rolling element bearing assembly 10 of FIG. 3 without the retaining ring 12 to reveal a first cavity or aperture 19 that is configured within the first circumferential groove 17 of the outer ring 18. With reference to the parametric view of the retaining ring 12 shown in FIG. 6, a first end has a radial inward directed protrusion 11, while a second end has a radial outward directed protrusion 13. Now referencing FIGS. 7 and 8, a split or two-piece housing assembly 48 is shown that contains a bore 57 for receiving the rolling element bearing assembly 10. The two-piece housing assembly 48 has an upper portion 50 and a lower portion 54 held together by two fasteners 60A,60B. A second circumferential groove 56 with a second cavity 52 is present on a second inner radial surface 51 of the bore 57. The second cavity 52 receives the radial outward directed protrusion 13 on the second end of the retaining ring 12 upon installation of the rolling element bearing assembly 10 of FIG. 3.

Figure 9:
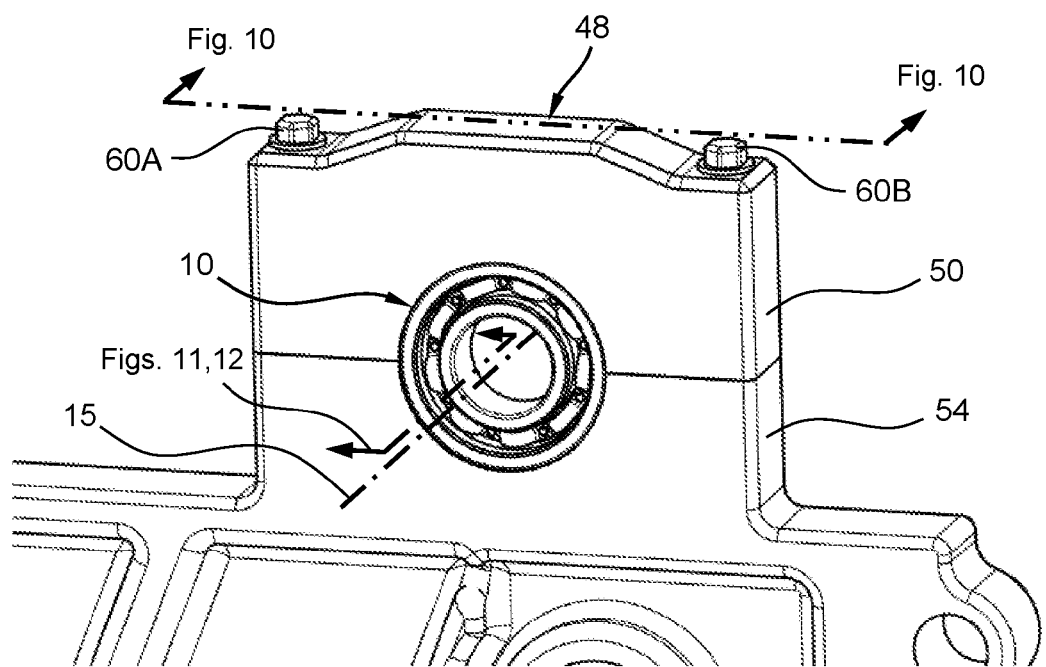
FIG. 9 is a perspective view of the example embodiment of a rolling element bearing assembly of FIG. 3 installed within the two-piece housing of FIG. 7.
Figure 10:
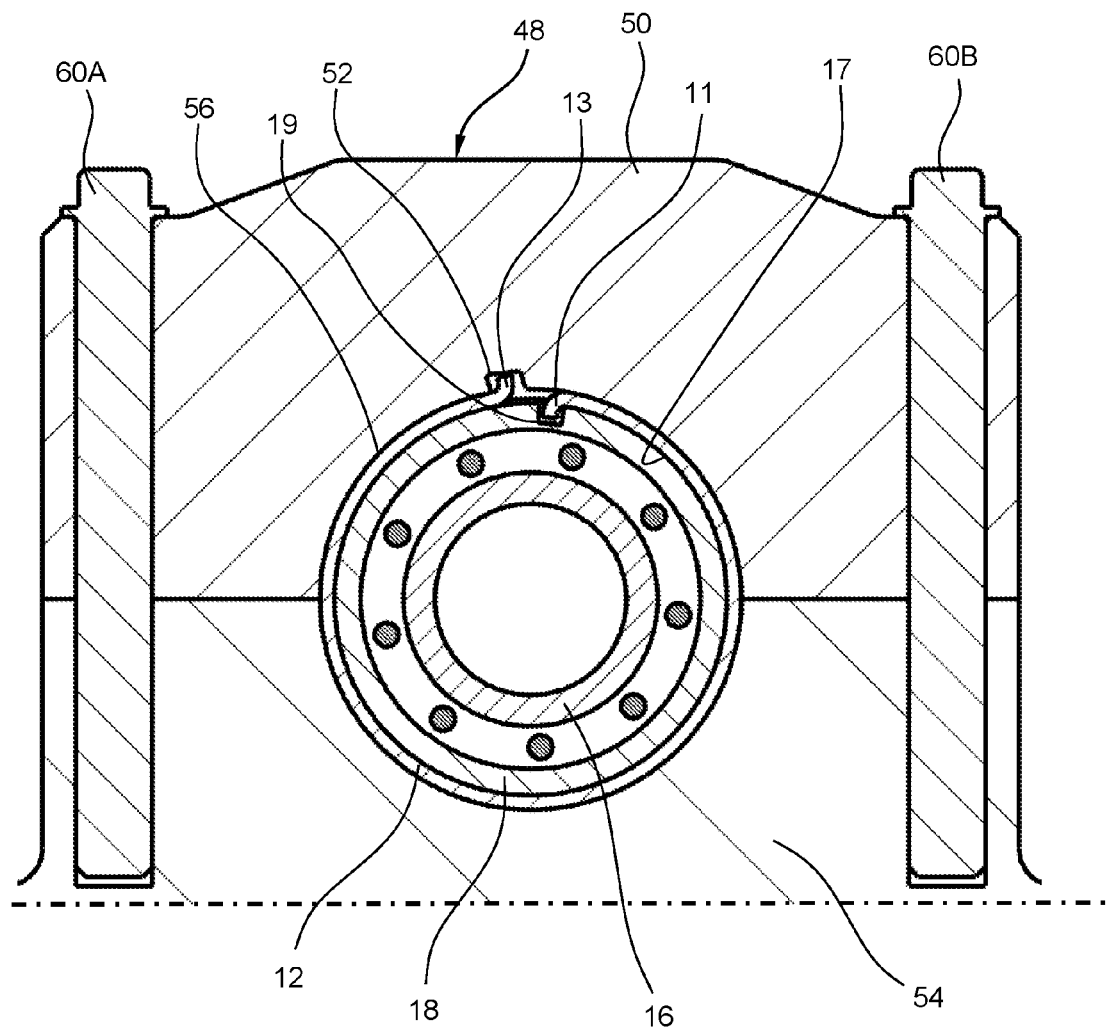
FIG. 10 is a cross-sectional view of a vertical section taken from FIG. 9.

Referring now to FIGS. 9 through 12, an explanation of how the retaining ring 12 and its respective interfaces provide axial and rotational retention of the rolling element bearing assembly 10 within the bore 57 of the two-piece housing assembly 48 is now provided. FIG. 9 shows the rolling element bearing assembly 10 installed within the two-piece housing 48. FIG. 10 shows a cross-sectional view of a vertical section taken from FIG. 9, revealing the retention ring 12 in its functional position and respective interfaces. The radial inward directed protrusion 11 on the first end of the retaining ring 12 engages the first cavity 19 of the first circumferential groove 17 of the outer ring 18, establishing a first rotational attachment point. The radial outward directed protrusion 13 on the second end of the retaining ring 12 engages the second cavity 52 of the second circumferential groove 56 of the housing 48, establishing a second rotational attachment point. Clockwise rotation of the outer ring 18 with respect to the housing 48 will cause the retaining ring 12 to be loaded in compression due to an unwinding effect that will attempt to increase the angular distance between the radial inward directed protrusion 11 and the radial outward directed protrusion 13 of the retaining ring 12. The magnitude of clockwise rotation will be limited to an angular position at which the radial outward portion 21 of the retaining ring 12 makes contact with the second circumferential groove 56 of the housing 48. A smaller design gap between the radial outward portion 21 of the retaining ring 12 and the second circumferential groove 56 will yield a smaller clockwise angular displacement of the outer ring 18 with respect to the housing 48. Anti-clockwise rotation of the outer ring 18 with respect to the housing 48 will cause the retaining ring 12 to be loaded in tension, attempting to bring the radial inward directed protrusion 11 and the radial outer directed protrusion 13 of the retaining ring 12 closer together. The magnitude of anti-clockwise rotation will be limited to an angular position at which the radial inward portion 26 of the retaining ring 12 makes contact with the first circumferential groove 17 of the outer ring 18. A smaller design gap between the radial inward portion 26 of the retaining ring 12 and the first circumferential groove 17 will yield a smaller angular displacement of the outer ring 18 with respect to the housing 48. It is possible to design the retaining ring 12 with a spring-like characteristic such that no gap exists between the radial inward portion 26 and the first circumferential groove 17, which would provide for a minimum anti-clockwise rotation allowance.

Figure 11:
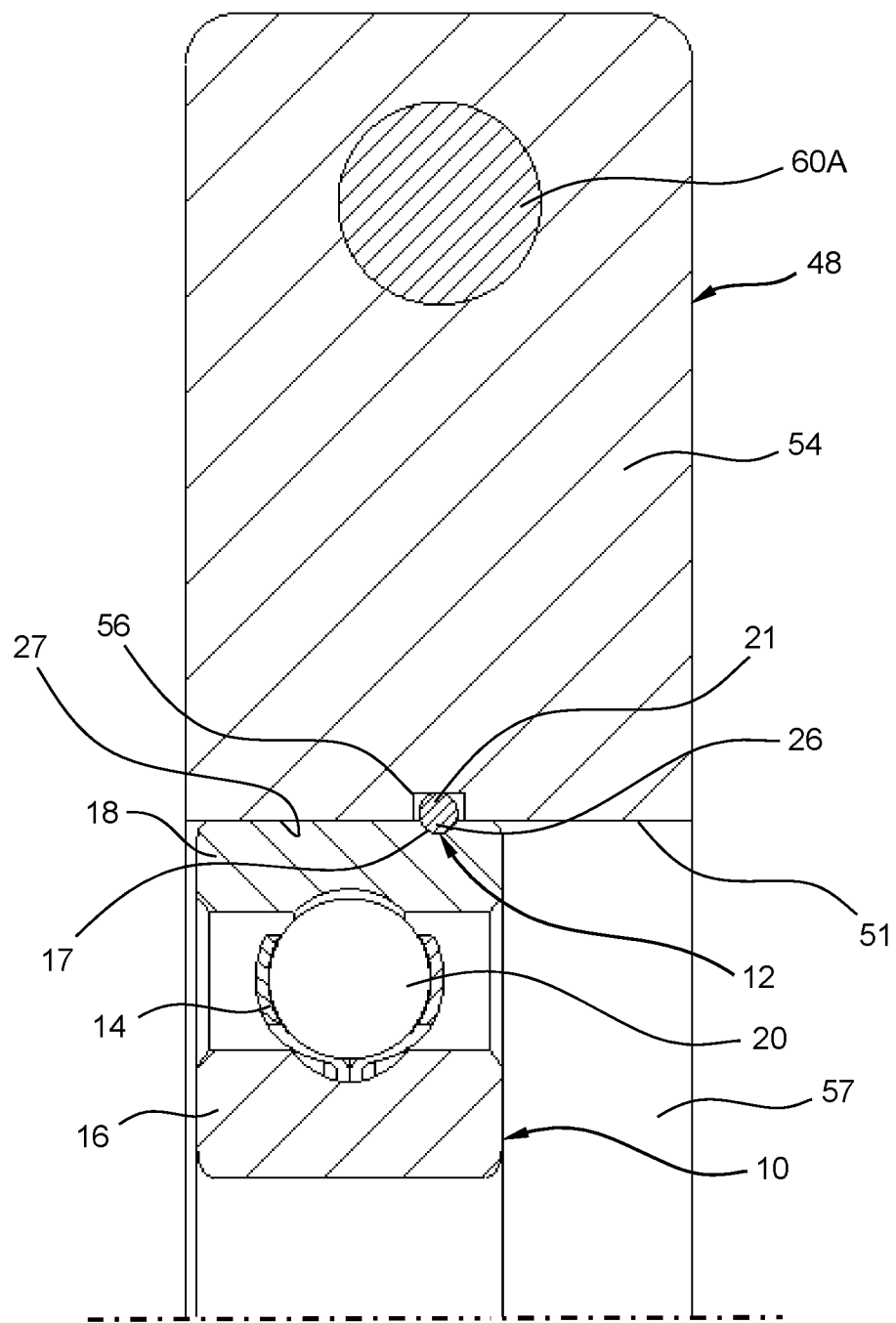
FIG. 11 is a cross-sectional view of a horizontal section taken from FIG. 9.

FIG. 11 shows a cross-sectional view of a horizontal section taken from FIG. 9 that illustrates the axial retention function of the retaining ring 12 and its respective first and second circumferential groove interfaces 17,56. With the rolling element bearing assembly 10 installed within the housing 48, the retaining ring 12 is received partially within the first circumferential groove 17 and partially within the second circumferential groove 56. This arrangement prevents the rolling element bearing 10 from moving axially within the bore 57 of the housing 48 in case of an axial load that is applied to the rolling element bearing 10 in either axial direction.

Figure 12:
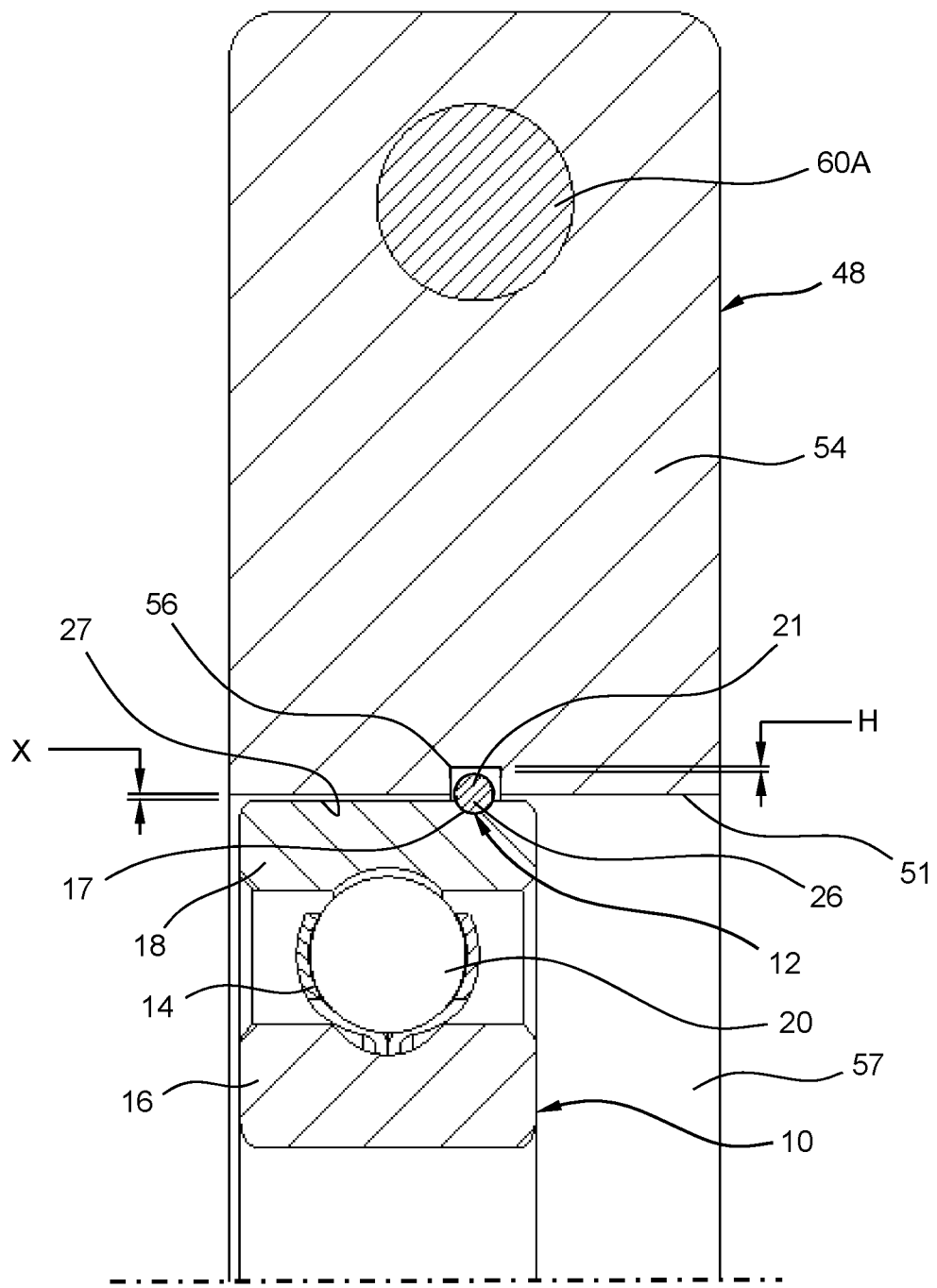
FIG. 12 is a cross-sectional view of a horizontal section taken from FIG. 9.

The previously described rolling element retention arrangement can be applied to housings of all materials, yet it is particularly effective for housing materials that have a higher COTE than the typical steel material used for the outer ring 18. FIG. 12 illustrates a condition where separation X between the bore 57 of the housing 48 and the outer ring 18 is present, a condition that was avoided in the prior art to ensure rotational and axial containment at all operating conditions. The disclosed example embodiment facilitates axial and rotational retention even if separation X exists between the bore 57 of the housing 48 and the outer ring 18. Separation X can add an additional distance H between the radial outward portion 21 of the retaining ring 12 and the second circumferential groove 56 of the housing 48, as shown in FIG. 12. Therefore, with reference to FIG. 10, clockwise rotation of the outer ring 18 with respect to the housing 48 will occur until the retaining ring 12 unwinds to the extent that the radial outward portion 21 makes contact with the second circumferential groove 56 of the housing 48. Axial retention of the outer ring 18 within the bore 57 of the housing 48 is still maintained as long as the magnitude of separation X between the outer ring 18 and the housing 48 does not exceed a critical distance at which an axial force applied to the outer ring 18 causes axial movement of the outer ring 18. If such a condition exists, the bearing designer can merely tune the size of the retaining ring 12 such that it protrudes further beyond the outer radial surface 27 of the outer ring 18 with a corresponding size adjustment to the second circumferential groove 56 to maintain axial retention at all temperature and loading conditions. Furthermore, the shape of the retaining ring 12 and the first and second circumferential grooves 17,56 can be of any suitable shape to facilitate axial and rotational retention of the outer ring 18 within the bore 57 of the housing 48. Given the fact that the disclosed example embodiment provides for axial and rotational retention even when separation X exists between the outer ring 18 and the bore 57 of the housing 48, the bearing designer has the capacity to reduce the severity of the interference fit between the outer ring 18 and the bore 57, which yields numerous advantages. Furthermore, when the COTE of the housing 48 is greater than the outer ring 18 of the rolling element bearing 18, a reduced interference fit provides for: 1). Reduced housing stresses, especially at severely cold temperatures when the bore 57 contracts more than the outer ring 18; 2). Reduced effect on bearing radial operating clearance, especially at severely cold temperatures, such that the radial operating clearance designed into the bearing does not have to be increased to avoid too severe of a reduced radial operating clearance condition, which provides for a more robust and potentially less noisy bearing; and 3). Reduced manufacturing effort to press the rolling element bearing assembly 10 into the housing 48.

One potential design scenario for a housing with a higher COTE than steel is to utilize an interference fit at a first portion of the operating temperature range, and the retaining ring 12 and associated interfaces at a second portion of the operating temperature range. For example, representing a first retained state, an interference fit between the second inner radial surface 51 of the bore 57 of the housing 48 and the outer radial surface 27 of the outer ring 18 could be utilized during a lower or colder portion of the operating temperature range to provide axial and rotation retention; and, representing a second retained state, during an upper or hotter portion of the operating temperature range, axial and rotational retention could be provided by the retaining ring 12, the first and second circumferential grooves 17,56, and the first and second cavities 19,52. Furthermore, a third transitional retained state may exist between the first and second retained states, where the function of rotational and axial retention is transferred from the interference fit between the bore 57 of the housing 48 and the outer radial surface 27 of the outer ring 18 to the retaining ring 12 and associated interfaces. For example, due to a potentially varying wall thickness of the housing that surrounds the outer ring 18, the second inner radial surface 51 of the bore 57 of the housing 48 may only be partially or intermittently in circumferential contact with the outer radial surface 27 of the outer ring 18, thereby providing partial rotational and axial retention; the presence of the retaining ring 12 and associated interfaces ensures that full rotational and axial retention is provided during this third transitional retained state.

Figure 7:
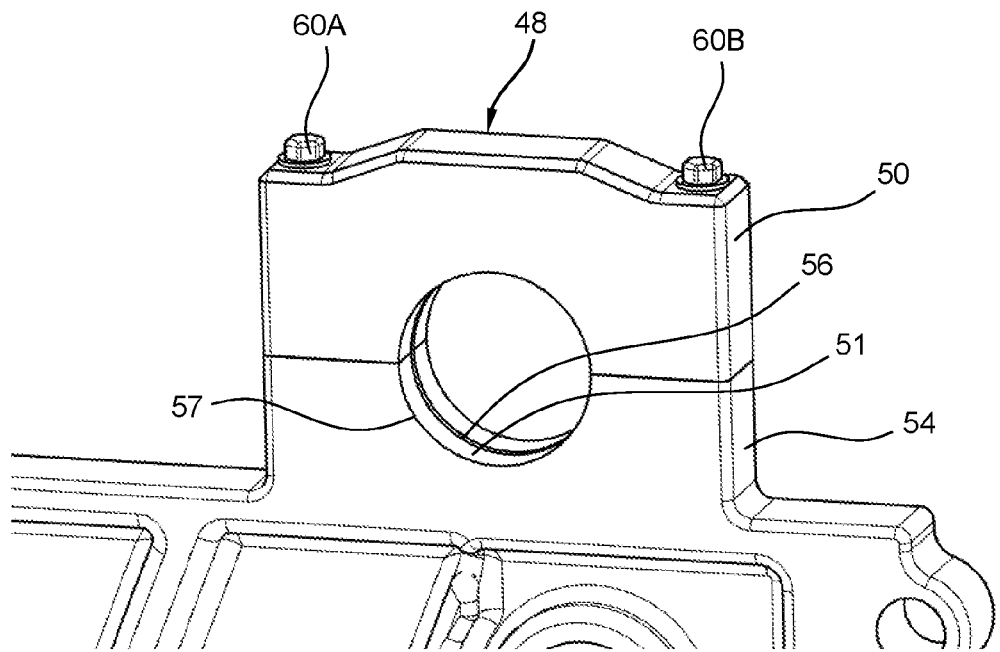
FIG. 7 is a perspective view of a two-piece housing.
Figure 8:
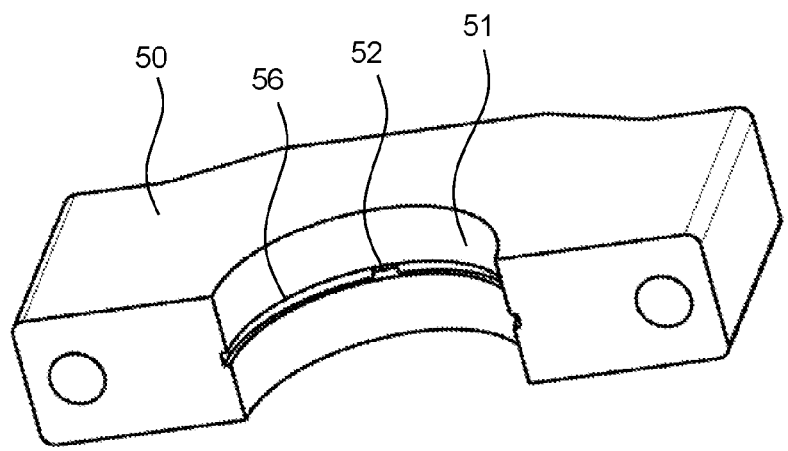
FIG. 8 is a perspective view of a top portion of the two-piece housing of FIG. 7.
Figure 13:
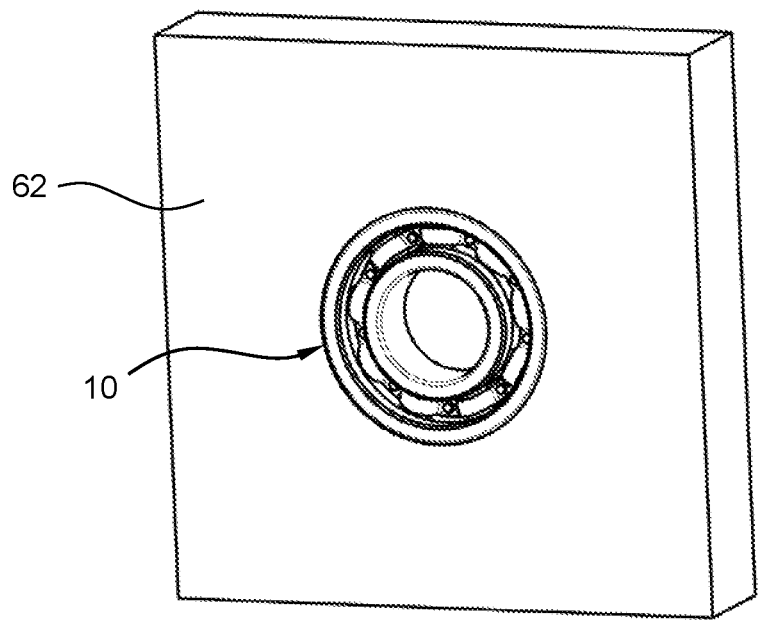
FIG. 13 is a perspective view of the example embodiment of a rolling element bearing assembly of FIG. 3 installed within a one-piece housing.

While the previous discussion assumed use of the two-piece housing 48 shown in FIGS. 7 and 9, the disclosed example embodiment and can also be applied to a one-piece housing 62 as shown in FIG. 13, offering the same design advantages.

Having thus described various embodiments of the present bearing arrangement in detail, it is to be appreciated and will be apparent to those skilled in the art that many physical changes, only a few of which are exemplified in the detailed description above, could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. A rolling element bearing retention arrangement comprising:
   an outer ring including:
      a first inner radial surface having an outer rolling element raceway;
      an outer radial surface having a first circumferential groove configured with a first cavity;
   a housing including:
      a coefficient of thermal expansion greater than a coefficient of thermal expansion of the outer ring;
      a bore with a second inner radial surface for receiving the outer ring, the second inner radial surface having a second circumferential groove configured with a second cavity; and,
   a retaining ring received partially by the first and second circumferential grooves, the retaining ring including:
      a radially inward directed protrusion at a first end engaged with the first cavity; and
      a radially outward directed protrusion at a second end engaged with the second cavity; and
   in a first retained state at a first temperature:
      the outer radial surface is axially and rotationally retained by the second inner radial surface by an interference fit; and,
   in a second retained state at a second temperature greater than the first temperature:
      the outer radial surface is axially and rotationally retained by the retaining ring, the first and second circumferential grooves, and the first and second cavities; and, the outer radial surface is separated from the second inner radial surface.

2. The rolling element bearing retention arrangement of claim 1, further comprising:
   an inner ring with an outer radial surface having an inner rolling element raceway; and
   a plurality of rolling elements disposed between the inner and outer rolling element raceways.

3. The rolling element bearing retention arrangement of claim 1, further comprising a cage having pockets configured to receive and circumferentially space a plurality of rolling elements.

4. The rolling element bearing retention arrangement of claim 1, wherein the housing is comprised of two portions retained by at least one fastener.

5. The rolling element bearing retention arrangement of claim 1, wherein in a third transitional retained state at a third temperature, between the first and second temperatures, the outer radial surface of the outer ring is partially axially and rotationally retained by the second inner radial surface of the bore of the housing.

6. A rolling element bearing assembly comprising:
   an outer ring configured to be received within a bore of a housing, the outer ring including:
      a first inner radial surface having an outer rolling element raceway;
      an outer radial surface having a first circumferential groove configured with a first cavity;
   a retaining ring received partially by the first circumferential groove, the retaining ring including:
      a radially inward directed protrusion at a first end engaged with the first cavity; and,
      a radially outward directed protrusion at a second end configured to engage with a second cavity arranged within a second circumferential groove on a second inner radial surface of the bore; and,
   in a first retained state at a first temperature:
      the outer radial surface is axially and rotationally retained by the second inner radial surface by an interference fit; and,
   in a second retained state at a second temperature greater than the first temperature:
      the outer radial surface is separated from the second inner radial surface; and,
      the outer radial surface is rotationally retained by the retaining ring, the first and second circumferential grooves, and the first and second cavities; and,
   wherein a coefficient of thermal expansion of the housing is greater than a coefficient of thermal expansion of the outer ring.

7. The rolling element bearing assembly of claim 6, further comprising:
   an inner ring with an outer radial surface having an inner rolling element raceway; and
   a plurality of rolling elements disposed between the inner and outer rolling element raceways.

8. The rolling element bearing assembly of claim 6, further comprising a cage having pockets configured to receive and circumferentially space a plurality of rolling elements.

* * * * *